No. 615,968. Patented Dec. 13, 1898.
T. CRANEY.
APPARATUS FOR TREATING ORES, &c.
(Application filed Jan. 3, 1898.)

(No Model.) 4 Sheets—Sheet 3.

Witnesses
Inventor
Thomas Craney
By
Attys.

No. 615,968. Patented Dec. 13, 1898.
T. CRANEY.
APPARATUS FOR TREATING ORES, &c.
(Application filed Jan. 3, 1898.)
(No Model.) 4 Sheets—Sheet 4.
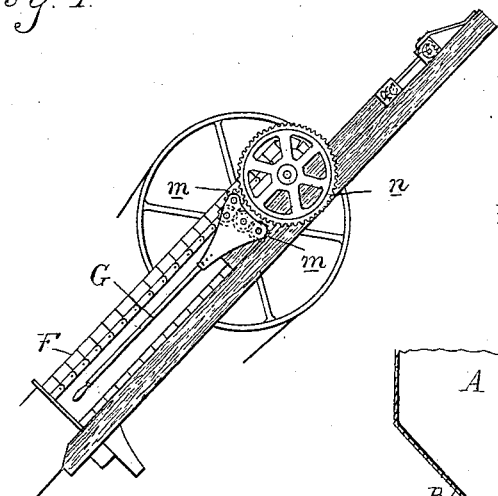
Fig. 4.
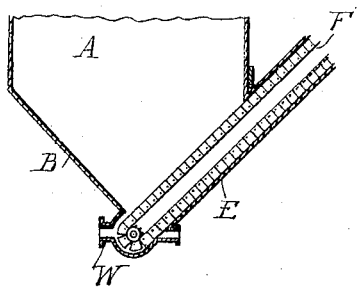
Fig. 6.
Fig. 5.
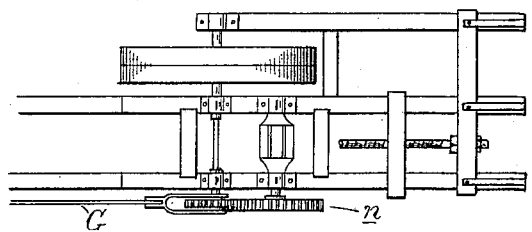
Fig. 7.
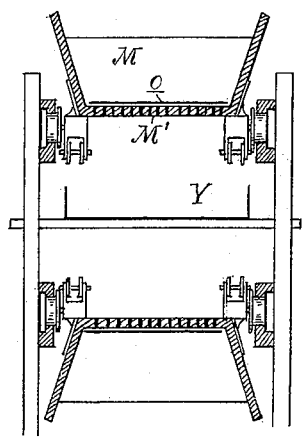
Witnesses
A. L. Hobby
P. M. Hulbert
Inventor
Thomas Craney
By his Attys.
THE NORRIS PETERS CO., PHOTO-LITHO., WASHINGTON, D. C.

UNITED STATES PATENT OFFICE.

THOMAS CRANEY, OF BAY CITY, MICHIGAN.

APPARATUS FOR TREATING ORES, &c.

SPECIFICATION forming part of Letters Patent No. 615,968, dated December 13, 1898.

Application filed January 3, 1898. Serial No. 665,422. (No model.)

*To all whom it may concern:*

Be it known that I, THOMAS CRANEY, a citizen of the United States, residing at Bay City, in the county of Bay and State of Michigan, have invented certain new and useful Improvements in Apparatus for the Treatment of Ores, &c., of which the following is a specification, reference being had therein to the accompanying drawings.

The object of the invention is to produce an apparatus adapted to carry out the extraction of metals from their ores by what is known as the "wet" process on a large commercial scale and in a manner more economical than in the present construction.

To this end my invention consists in the peculiar construction, arrangement, and combination of a series of tanks and conveyers arranged for the continuous treatment of ore with a solvent and of a device operating in connection therewith to extract the solution from the ore after its treatment, all as more fully hereinafter described and shown.

Figure 1:
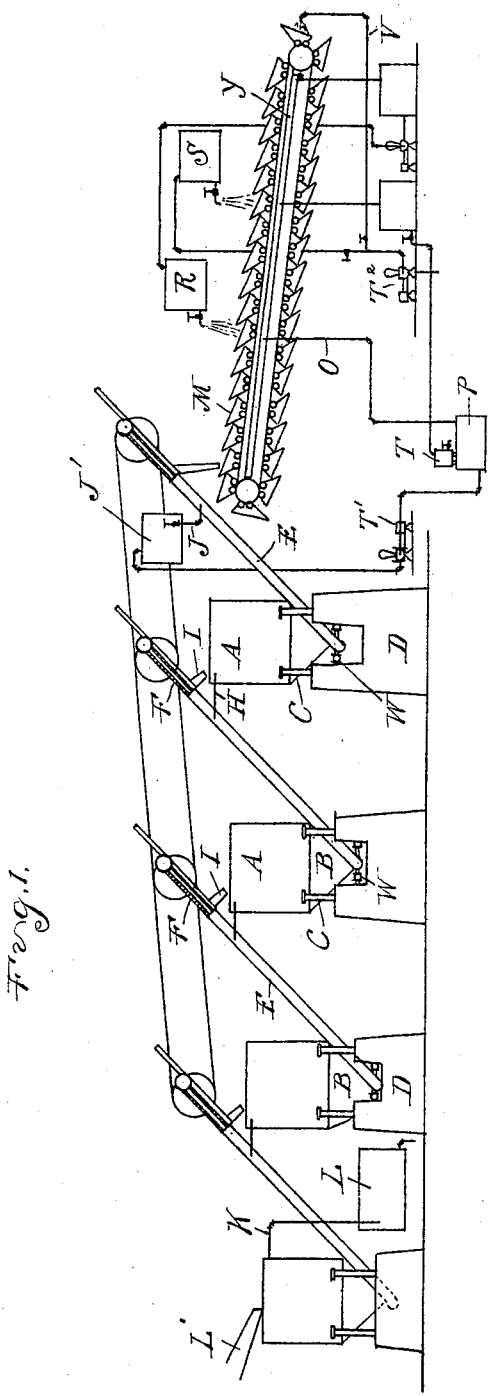
Figure 2:
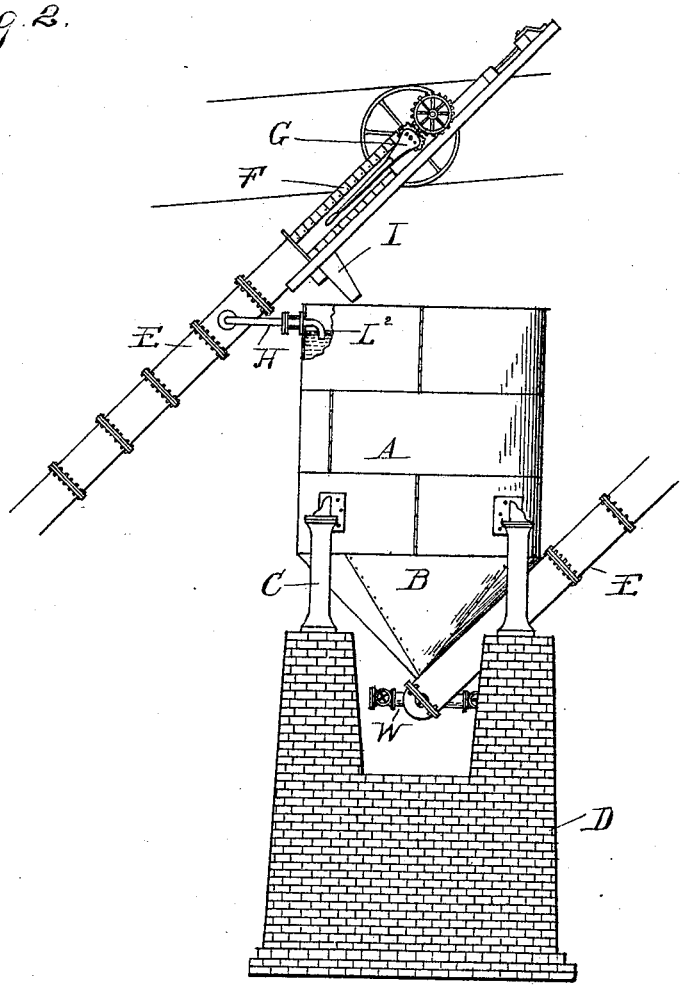
Figure 3:
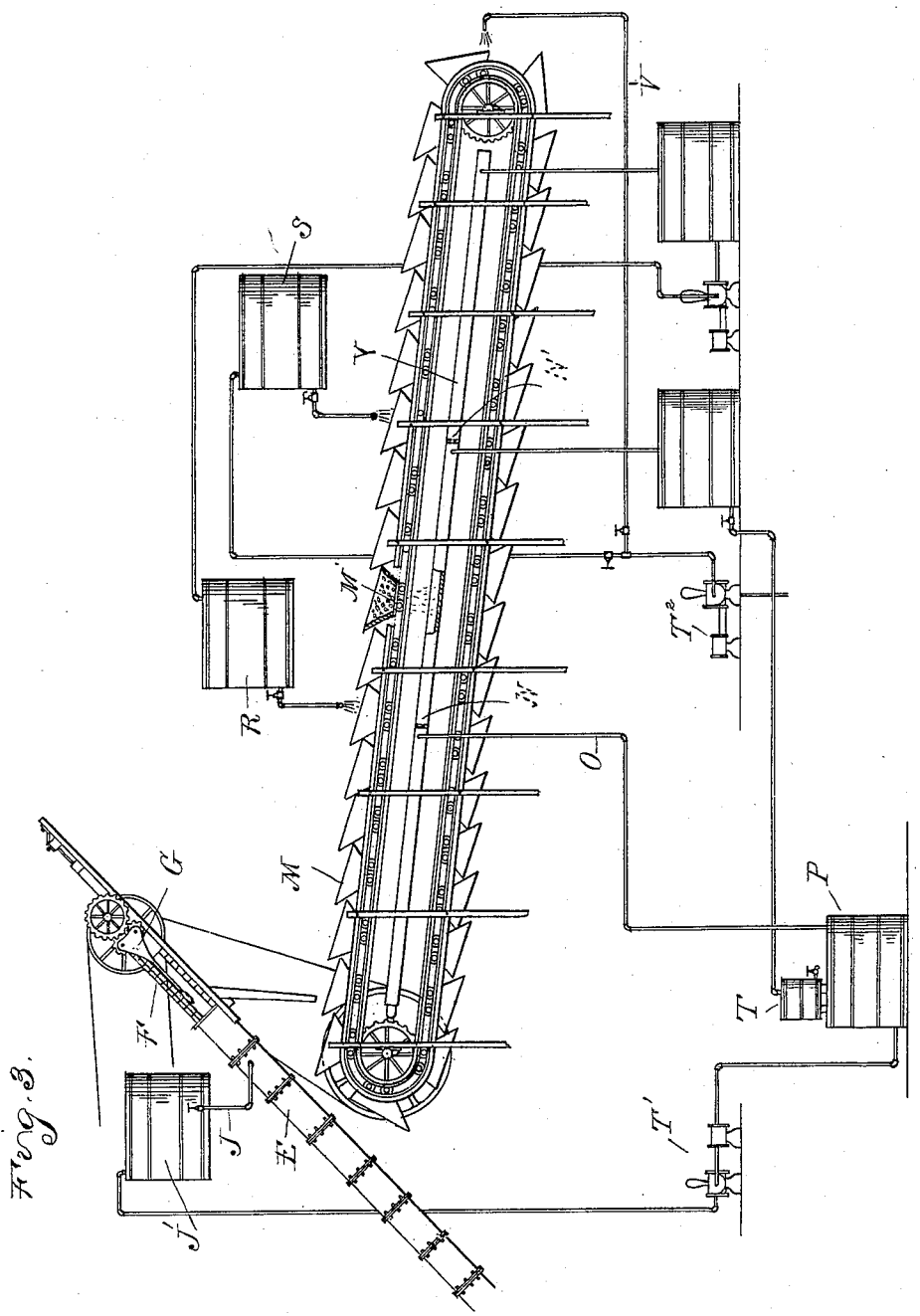

In the drawings, Figure 1 is a general view of the whole apparatus in diagram. Fig. 2 is a detached elevation of one of the tanks on a larger scale. Fig. 3 is an enlarged elevation of the means shown in Fig. 1 of draining and washing the ore. Figs. 4 and 5 are an enlarged side elevation and a plan, respectively, of the upper end of one of the conveyers. Fig. 6 is an enlarged section of the lower end of one of the tanks and the conveyer. Fig. 7 is an enlarged cross-section through the buckets M.

My apparatus comprises a series of large tanks A, preferably supported at different heights. The preferable form of these tanks is the upright cylindrical form provided with a hopper-bottom B and supported on pillars C on a suitable foundation D. Each tank communicates at the bottom with a conveyer-trunk E, which incloses a suitable conveyer F, preferably of the type of an endless scraper provided with suitable means for adjustment and to which motion is imparted from a suitable source of power, the construction being preferably such that by means of a reverse-lever G the motion of the scraper may be obtained in either direction. Each conveyer-trunk extends to a point above the level of its tank and has connected to it a feed-pipe H, which connects it with the next adjacent tank, and at a distance above it has a discharge-spout I, through which the material is discharged into the adjacent tank by the scraper. In this manner connections are provided for the flow of the liquid used for the solvent from one tank into the other, and by connecting the last tank of the series with a supply-pipe J, leading from a source of supply J' into the trunk of the last tank, and providing the first tank with an overflow-pipe K into the receiver L a continuous flow of the liquid through the apparatus is produced in one direction.

By the operation of each scraper the ore is carried out through the bottom of each tank and discharged into the top of the adjacent tank, and by feeding the ore continuously through a spout L' into the first tank a continuous flow or forward movement of the ore is produced through the series of tanks in a direction opposite the flow of the solvent, but in constant contact therewith.

In applying my apparatus to the well-known cyanid process for extracting gold from ores the ore is delivered into the first tank either directly from the stamp-mills, if the nature of the ore permits it, or after having received such treatment as will put it in the necessary condition for the present treatment, and the amount of ore fed and the speed of the conveyers are so regulated that the tanks will be kept normally filled all the time to a point below the pipes H. The ore in each tank thus works its way gradually to the bottom and is conveyed through the trunk into the next adjacent tank, where it takes the same course, and after passing through the tanks it is discharged from the last tank. During this travel the ore is continuously in contact with the solvent, which travels in the reverse direction by hydrostatic pressure, and thus comes in contact with ore of gradually-increasing richness, so that the strongest solvent acts upon the exhausted ore first, and as it becomes more exhausted by saturation it comes in contact with richer ore and finally overflows in its most saturated condition from the first tank which receives the fresh ore. By this manner of extracting the ore and the solvent are brought into intimate and prolonged contact, and by the time the ore is discharged from the last tank every trace of the metal that can be is dissolved out and received in solution in the receiver L, connected to the first tank of the series.

For convenience of operation and for contingencies which may occur I provide each conveyer-trunk at the bottom with valve-controlled discharge-openings W, and as the reverse-lever in each conveyer permits of reversing the carrier an obstruction, if any should occur in the operation, can be readily removed and the apparatus can also be readily cleaned out.

A further part of my invention embraces an arrangement for draining and washing the ore after it is discharged from the last tank. To this end I arrange below the discharge-spout of the last tank an endless-chain arrangement carrying a continuous series of overlapping drainage-buckets M, preferably provided with a filter-bottom M' and moving above the fixed trough Y, which receives the drip from the upright buckets. This trough is divided into sections by partitions N. The first section thereof nearest the receiving end receives the free drip from the buckets and conveys it through a pipe O to a collecting-tank P. The next division receives a diluted liquid obtained by discharging a stream of water, or preferably a weak solution of the solvent obtained from a previous wash, from the tank R into the buckets as they pass underneath, and a further washing, which may now be of clear water, is obtained from a tank S, from which the drainage enters the third division of the trough. The liquid from this last washing is preferably conveyed and supplied into the tank used for the first wash, and the liquid obtained from the first wash is preferably conducted into the collecting-tank P after passing through a dissolving-tank T, in which it may be strengthened by bringing it in contact with solid cyanid salt. The liquid thus collected in tank P is then delivered to tank J' by a pump T'. In this manner none of the solvent is wasted.

The pump T² which I have shown is for pumping fresh water to the tank S and also through a pipe V to a nozzle which squirts the water into the buckets and washes them out clean as they pass around the end of the carrier after having dumped.

The overflow-pipes H from the tanks are each provided with an elbow L² at the inner end for the purpose of allowing a protective covering of hydrocarbon to remain on the surface of the liquid in the tank, which prevents the carbonic acid of the air from coming in contact with the cyanid. I do not limit myself to this particular device for washing the ore, but may avail myself of any suitable apparatus for the purpose, such as a continuous-operating centrifugal filter.

It will be understood that the object of connecting the feed-pipes H to the conveyer-trunks is for the purpose of keeping the ore in constant contact with the solution; but should the nature of the ore or other circumstances render this impracticable it is obvious that the feed-pipes may be connected into the bottom of the tank.

As shown in Figs. 4 and 5, the lever G carries two pinions m m, driven in opposite directions by a central pinion on the drive-shaft upon which the lever G is pivoted, so that either of the pinions m m can be thrown into engagement with the gear-wheel n, which transmits motion to the conveyer. Any other known reversing device may be employed. The construction also provides means for tightening the conveyer-chain.

The filtering-bottom of the buckets M may be constructed in any known manner. A simple way is shown in Fig. 7, in which the bottom is perforated and covered with suitable filtering-paper o.

Fig. 6 shows the opening leading from the bottom of the tank into the conveyer-trunk.

What I claim as my invention is—

1. In an apparatus for the treatment of ore, the combination of a series of tanks, each adapted to contain a large body of the ore to be treated, conveyers connecting the tanks for feeding the ore from the bottom of one tank into the top of the next tank in series and discharging it from the bottom of the last tank, means for feeding ore into the top of the first tank of the series, means for feeding a solvent into the bottom of the last tank, connections between the tanks for conveying the solvent from the top of each tank into the bottom of each preceding tank, and a discharge-outlet from the top of the first tank, the arrangement being such that a flow of the solvent and a flow of ore are maintained in all the tanks in opposite direction.

2. In an apparatus for the treatment of ore, the combination of a series of tanks, each adapted to contain a large body of the ore to be treated and provided with a bottom outlet for the gradual discharge of the ore therefrom, by gravity, a conveyer for each tank having an inclined trunk communicating with the bottom outlet of the tank and having a discharge-outlet above the next tank for conveying the ore from one tank into the one next in series and discharging it from the last tank, means for feeding ore into the first tank, a supply-pipe discharging into the conveyer-trunk of the last tank for feeding a solvent into said tank, overflow-pipes from each tank into the conveyer of the preceding tank, and a discharge-outlet for the solvent from the top of the first tank.

3. In an apparatus for the treatment of ore, the combination of a tank adapted to contain a body of the ore to be treated and provided with an outlet at the bottom for the gradual discharge of the ore from said tank by gravity, a conveyer communicating with said outlet and adapted to remove the ore therefrom and discharge it at a point above the tank, means for feeding ore into the top of the tank and adapted to maintain the body of ore therein, a supply-reservoir and receiver for the solvent, and connections from the supply-reservoir into the bottom of the tank and from the top thereof into the receiver and adapted to maintain a continuous flow of the solvent through the ore in the tank.

4. The combination, in an apparatus for the treatment of ore, of an endless-chain carrier provided with buckets having filter-bottoms, a trough beneath the same divided into compartments for receiving the drainage from the buckets of different portions of the chain separately, and means for discharging a liquid upon the buckets above one or more of said compartments.

5. The combination with a tank arranged for the continuous treatment of the ore means for the continuous discharge of the ore therefrom at a point above the tank, an endless chain carrying buckets provided with filtering-bottoms and overlapping ends and arranged in proximity to the tank to receive the ore discharged therefrom, a trough beneath said chain divided into compartments which receive the drainage of the buckets separately in succession, one or more tanks arranged above the buckets, and means for supplying one or more of said tanks with liquid derived from the drainage of the buckets.

6. The combination of the tank A provided with a hopper-bottom B, the inclined conveyer-trunk E connected to the bottom of the tank and extending to a point above the tank, a discharge-spout from said trunk, an endless scraper in said trunk, a feed connection into the trunk a reservoir supplying the same with liquid and an overflow-pipe from the tank.

7. In an apparatus for treating ore, the combination of the tank A, the inclined conveyer-trunk E connected to the bottom of the tank and provided with a discharge-spout at a point above the tank, the endless scraper in said trunk, means for reversing the movement of said scraper and the valve-controlled discharge-openings W at the bottom of the conveyer-trunk.

8. In an apparatus for treating ore, the combination of a tank adapted to contain a body of the ore to be treated, devices for feeding ore into the top of the tank and removing it from the bottom thereof to a point above the tank and thereby produce a downward movement of the ore through the tank, a feed-pipe communicating into the bottom of the tank, a source of supply communicating with said feed-pipe for supplying the tank with a solvent and a sealed overflow-pipe from the top of said tank adapted to maintain the level of the solvent in the tank at a height above the inlet into said overflow-pipe.

9. In an apparatus for treating ore, the combination of a tank adapted to contain a body of the ore to be treated, devices for feeding ore into the top of said tank and discharging it from the bottom thereof at a point above the tank in a continuous manner, a solvent-supply reservoir, a receiver, connections between the tank and said supply-reservoir and receiver for producing a continuous flow of the solvent through the tank in a direction opposite to that of the movement of the ore, an endless-chain carrier in proximity to the tank and having draining-buckets adapted to receive the ore discharged from the tank, means for discharging a liquid upon the drainage-buckets and means for collecting the drainage from the buckets and returning it to the aforesaid supply-reservoir.

In testimony whereof I affix my signature in presence of two witnesses.

THOMAS CRANEY.

Witnesses:
M. B. O'DOGHERTY,
OTTO F. BARTHEL.